2,865,943
Patented Dec. 23, 1958

2,865,943

PROCESS OF MAKING O,O-DIMETHYL-O-(β,β-DICHLOROVINYL)-PHOSPHATE

Walter Lorenz, Wuppertal-Elberfeld, Germany, assignor to Farbenfabriken Bayer Aktiengesellschaft, Leverkusen, Germany, a corporation of Germany No Drawing. Application September 15, 1954
Serial No. 456,332

Claims priority, application Germany May 25, 1954

8 Claims. (Cl. 260—461)

The present invention relates to O,O-dimethyl-O-(β,β-dichlorovinyl)-phosphate, a new and useful organic phosphate compound and to methods of preparing the same. This invention includes more particularly new improvements in procedures of producing this novel phosphate.

The many uses to which phosphoric acid derivatives have been put in recent years, e. g., plasticizers and insecticides, have created considerable demand for these compounds. Accordingly, an extensive amount of work has been done to improve existing procedures for their preparation. This is particularly true in the field of phosphoric acid esters whose valuable properties for the use as insecticides has greatly increased the demand for this type of product.

Notwithstanding the large amount of work done to improve existing methods for the manufacture of phosphoric acid esters, serious problems still exist in obtaining products of substantially good insecticidal properties and in obtaining these in high yield.

A principal object of the present invention is the provision of a novel and useful insecticide. A further object is the provision of a new improvement in the manufacture of O,O-dimethyl-O-(β,β-dichlorovinyl)-phosphate.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished, according to the present invention, in the process for manufacture of O,O-dimethyl-O-(β,β-dichlorovinyl)-phosphate having the following formula:

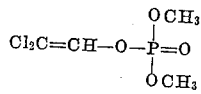

In accordance with the invention it has been found that the hitherto unknown O,O-dimethyl-O-(β,β-dichlorovinyl)-phosphate can be obtained by contacting (β,β,β-trichloro-α-hydroxyethyl)-dimethyl-phosphonate with alkaline reacting substances, e. g. with alkali metal hydroxides, alkali metal carbonates, ammonia or organic amides. Preferably the reaction is carried out in water or water soluble lower aliphatic alcohols. The reaction temperature may be within the range of 0°–100° C. but temperatures of 20° to about 70° C. are preferred.

The rearrangement of O,O-dimethyl-O-(β,β-dichlorovinyl)-phosphate occurs with splitting off one mol of hydrochloric acid. This is very surprising, because α-hydroxy alkyl phosphoric acid esters are known to react with alkali metal hydroxides to form ketones or aldehydes and the corresponding dialkylphosphites. The rearrangement, however, is limited to this methyl ester and cannot be applied to higher alkyl homologs. Not even the diethyl phosphonate is capable of rearranging to the corresponding diethyl dichloro vinyl phosphate.

The rearrangement is shown by the following equation:

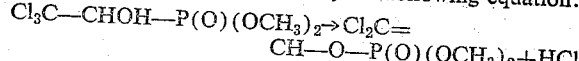

The following examples illustrate this invention:

Example 1

129 g. of (β,β,β-trichloro-α-hydroxyethyl)-dimethyl-phosphonate are dissolved in 1.3 liters of water and 40 mls. of concentrated ammonia solution are added. After heating for half an hour to 50–60° C. the pH-value of the solution has reached the neutral point. The heavy oil is taken up in tetrachloromethane, washed with a small amount of water and then dried with sodium sulfate. The tetrachloromethane is distilled off and the O,O-dimethyl-O-(β,β-dichlorovinyl)-phosphate is distilled over at 0.1 mm. at 69–71° C. in an amount of 53 g. (48% of the theoretical).

Example 2

129 g. of (β,β,β-trichloro-α-hydroxyethyl)-dimethyl-phosphonate are dissolved in 250 ccm. of methanol. To this solution is added a solution of sodium methylate, prepared from 11.5 g. of metallic sodium in 100 ccm. of methanol, at a temperature below 30° C. The sodium chloride is filtered off with suction and the methanol is distilled off in vacuo. The oily residue is taken up in benzene and washed with water until the washing solution is free of ionic chlorine. After drying over sodium sulfate the benzene is distilled off, the residue is fractionated at 3 mm. 45 g. of O,O-dimethyl-O-(β,β-dichlorovinyl)-phosphate distilled over at 86–87° C. (49% of the theoretical).

Example 3

129 g. of (β,β,β-trichloro-α-hydroxyethyl)-dimethyl-phosphonate are dissolved in 250 ccm. of water. At a temperature of 25–30° C. there are added dropwise 53 g. of triethylamine. After stirring for half an hour the oil is taken up in tetrachloromethane. After drying and distilling off the solvent, 65 g. of β,β-dichlorovinyl-dimethylphosphate are obtained (51% of the theoretical).

Example 4

129 g. of (β,β,β-trichloro-α-hydroxyethyl)-dimethyl-phosphonate are dissolved in 500 ccm. of water and warmed up to 30–70° C. While stirring there is added dropwise a solution of 20 g. sodium hydroxide in 50 ccm. of water. The reaction is exothermic and heavy colorless oil separates. The temperature rises to about 90° C. The vinyl ester is recovered as described in the foregoing examples. 64 g. of O,O-dimethyl-O-(β,β-dichlorovinyl)-phosphate are obtained (58% of the theoretical).

Example 5

129 g. of (β,β,β-trichloro-α-hydroxyethyl)-dimethyl-phosphonate are dissolved in 500 ccm. of water as described in the foregoing examples. A concentrated solution of 20 g. sodium hydroxide is added dropwise at a temperature of 5–10° C. After recovering as described in the foregoing examples there are obtained 60 g. of O,O-dimethyl-O-(β,β-dichlorovinyl)-phosphate (56% of the theoretical).

Example 6

129 g. of (β,β,β-trichloro-α-hydroxyethyl) dimethyl-phosphonate are dissolved in 500 ccm. of water at a temperature of 75° C. At this temperature are added dropwise 30 g. of sodium carbonate in 200 ccm. of water and the solution is stirred for a further half hour at 70–75° C. After this period the solution becomes neutral. The heavy oil is taken up in tetrachloromethane and recovered as described in the foregoing examples. There are obtained 58 g. of O,O-dimethyl-O-(β,β-dichlorovinyl)-phosphate which distills over at 1 mm. at 69–71° C. (53% of the theoretical).

The O,O-dimethyl-O-(β,β-dichlorovinyl)-phosphate may be employed in controlling many types of insects and mites such as, for example, the black bean aphid, green peach aphid, pea aphid, chrysanthemum aphid, greenhouse thrips, California red scale, citrus red spider, greenhouse red spider, milkweed bug, mealy bug, sow bug, German cockroach, southern army worm, yellow fever mosquito, malarial mosquito, Mexican bean beetle, *Tribolium confusum*, and black carpet beetle.

The new compound may also be used in combination with insecticides such as lead arsenate, nicotine, rotenone, pyrethrum, benzene hexachloride, 1,1,1-trichloro-2,2-di(p-chlorophenyl)-ethane, dodecyl thiocyanate, phenothiozine, and the like; with fungicides such as sulfur, various copper compounds, mercury salts, and the like; and with various types of plant foods and fertilizers.

While the invention has been described with particular reference to specific embodiments, it is to be understood that it is not to be limited thereto, but is to be construed broadly and restricted solely by the scope of the appended claims.

The vary good insecticidal properties are shown by the fact that aphids and spider mites are for instance completely killed in a concentration of 0.01 percent. Furthermore the O,O-dimethyl-O-(β,β-dichlorovinyl)-phosphate is distinguished by a remarkable systemic action.

We claim:

1. Process for the production of the O,O-dimethyl-O-(β,β-dichlorovinyl)-phosphate which comprises contacting (β,β,β-trichloro-α-hydroxyethyl)-dimethyl-phosphonate with an alkaline reacting agent.

2. Process for the production of O,O-dimethyl-O-(β,β-dichlorovinyl)-phosphate which comprises contacting a solution of (β,β,β-trichloro-α-hydroxyethyl)-dimethylphosphonate with a solution of a member selected from the group consisting of alkali metal hydroxides, alkali metal carbonates and ammonia and recovering the O,O-dimethyl-O-(β,β-dichlorovinyl)-phosphate.

3. Process for the production of O,O-dimethyl-O-(β,β-dichlorovinyl)-phosphate which comprises contacting a solution of (β,β,β-trichloro-α-hydroxethyl)-dimethylphosphonate with a solution of a member selected from the group consisting of alkali metal hydroxides, alkali metal carbonates and ammonia in a solvent selected from the group consisting of water and lower aliphatic alcohols at a temperature from about 0–100° C. and recovering the O,O-dimethyl-O-(β,β-dichlorovinyl)-phosphate.

4. Process in accordance with claim 3 in which the alkaline reacting substance is sodium hydroxide.

5. Process in accordance with claim 3 in which the alkaline reacting substance is sodium carbonate.

6. Process in accordance with claim 3 in which the alkaline reacting substance is ammonia.

7. Process in accordance with claim 3 in which the solvent is water.

8. Process in accordance with claim 3 in which the solvent is methanol.

References Cited in the file of this patent

UNITED STATES PATENTS

| | | |
|---|---|---|
| 2,613,221 | Ladd et al. | Oct. 7, 1952 |
| 2,631,162 | Ladd et al. | Mar. 10, 1953 |

OTHER REFERENCES

Mattson et al.: Agricultural and Food Chem., vol. 3, No. 4, April 1955, pp. 319–21.

Perkow et al.: Naturwissenschaften, Jah. p. 353.

Corey et al.: Science, vol. 118, July 3, 1953, pp. 28–29.